United States Patent
Kunamalla et al.

(10) Patent No.: US 11,863,607 B2
(45) Date of Patent: Jan. 2, 2024

(54) TECHNIQUES FOR CLIENT-CONTROLLED PACING OF MEDIA STREAMING

(71) Applicant: NETFLIX, INC., Los Gatos, CA (US)

(72) Inventors: Shravya Kunamalla, San Jose, CA (US); Grenville Armitage, Melbourne (AU); Te-Yuan Huang, Campbell, CA (US); Peter Lei, Arlington Heights, IL (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

(21) Appl. No.: 17/495,772

(22) Filed: Oct. 6, 2021

(65) Prior Publication Data
US 2023/0108107 A1 Apr. 6, 2023

(51) Int. Cl.
H04L 29/06 (2006.01)
H04L 65/70 (2022.01)
H04L 65/80 (2022.01)
H04L 67/02 (2022.01)
H04L 69/326 (2022.01)

(52) U.S. Cl.
CPC ............. H04L 65/70 (2022.05); H04L 65/80 (2013.01); H04L 67/02 (2013.01); H04L 69/326 (2013.01)

(58) Field of Classification Search
CPC ... H04L 47/193; H04L 47/196; H04L 69/161; H04L 69/169; H04L 69/165; H04L 69/166; H04L 2101/663; H04L 67/02; H04L 69/326; H04M 13/6547; H04W 80/06; H04W 28/0273
See application file for complete search history.

(56) References Cited

U.S. PATENT DOCUMENTS

| | | | |
|---|---|---|---|
| 7,502,860 B1 * | 3/2009 | Champagne | H04L 69/163 709/227 |
| 7,779,146 B2 * | 8/2010 | Deshpande | H04N 21/4333 709/233 |
| 9,444,792 B2 * | 9/2016 | Katz | H04L 63/029 |

(Continued)

OTHER PUBLICATIONS

Hsiao, Pai-Hsiang et al. "Video over TCP with receiver-based delay control." NOSSDAV '01 (2001). (Year: 2001).*

(Continued)

*Primary Examiner* — Chirag R Patel
(74) *Attorney, Agent, or Firm* — Artegis Law Group, LLP

(57) ABSTRACT

In various embodiments, a media delivery application transmits encoded chunks of a media title to a playback application. In operation, the media delivery application receives, via a media channel, an encoded chunk request that has been transmitted over a TCP connection. The media delivery application also receives, via a side channel, a pacing specification that is associated with the encoded chunk request and has been transmitted over the TCP connection. As per the encoded chunk request, the media delivery application retrieves encoded chunk content. The media delivery application sets a parameter associated with the TCP connection equal to a parameter value based on the pacing specification. Subsequently, the media delivery application causes TCP segments corresponding to the encoded chunk content to be transmitted, via the media channel, over the TCP connection in accordance with the first parameter value.

20 Claims, 4 Drawing Sheets

(56) References Cited

U.S. PATENT DOCUMENTS

| | | | | |
|---|---|---|---|---|
| 2011/0167170 | A1* | 7/2011 | Kovvali | H04L 67/565 709/232 |
| 2013/0044598 | A1* | 2/2013 | Zhang | H04L 43/0882 370/232 |
| 2013/0227102 | A1* | 8/2013 | Beck | H04L 65/612 709/224 |
| 2013/0332620 | A1* | 12/2013 | Gahm | H04L 65/60 709/231 |
| 2017/0171287 | A1* | 6/2017 | Famaey | H04N 21/23439 |
| 2021/0105333 | A1* | 4/2021 | Chen | H04L 65/752 |
| 2021/0211384 | A1* | 7/2021 | Fraser | H04L 47/76 |

OTHER PUBLICATIONS

J. Kua, G. Armitage and P. Branch, "A Survey of Rate Adaptation Techniques for Dynamic Adaptive Streaming Over HTTP," in IEEE Communications Surveys & Tutorials, vol. 19, No. 3, pp. 1842-1866, thirdquarter 2017, doi: 10.1109/COMST.2017.2685630. (Year: 2017).*

A. Aggarwal, S. Savage and T. Anderson, "Understanding the performance of TCP pacing," Proceedings IEEE INFOCOM 2000. Conference on Computer Communications. Nineteenth Annual Joint Conference of the IEEE Computer and Communications Societies (Cat. No. 00CH37064), 2000, pp. 1157-1165 vol. 3, doi: 10.1109 (Year: 2002).*

Blandford, Daniel & Goldman, Sally & Gorinsky, Sergey & Zhou, Yan & Dooly, Daniel. (2005). Smartacking: improving TCP performance from the receiving end. (Year: 2005).*

M. Ghobadi and Y. Ganjali, "TCP Pacing in Data Center Networks," 2013 IEEE 21st Annual Symposium on High-Performance Interconnects, 2013, pp. 25-32, doi: 10.1109/HOTI.2013.18. (Year: 2013).*

Ghobadi, Monia et al. Trickle: Rate Limiting YouTube Video Streaming. University of Toronto, 2012 USENIX Annual Technical Conference, Jun. 13-15, 2012, Boston, MA. 6 pages.

International Search Report for application No. PCT/US2022/077449 dated Dec. 22, 2022.

Chen et al., "Streaming rate pacing for DASH with Server Push and WebSockets", MediaTek, Inc., Motion Picture Expert Group or ISO/IEC JTC1/SC29/WG11), May 2016, 4 pages.

Mueller et al., "Dynamic Adaptive Streaming over HTTP/2.0", 2013 IEEE International Conference on Multimedia and Expo (ICME), 2013, 6 pages.

Belshe et al., "Hypertext Transfer Protocol version 2 draft-ietf-httpbis-http2-16.txt", Nov. 29, 2014, 92 pages.

Bentaleb et al., "A Survey on Bitrate Adaptation Schemes for Streaming Media Over HTTP", IEEE Communications Surveys & Tutorials, vol. 21, No. 1, 2018, pp. 562-585.

Summers et al., "Characterizing the Workload of a Netflix Streaming Video Server", IEEE International Symposium on Workload Characterization (IISWC), Sep. 25, 2016, pp. 43-54.

Viswanathan et al., "Final Draft International Standard for 23009-6: DASH with Server Push and WebSockets", Apr. 2017, 49 pages.

Esteban et al., "Interactions between HTTP Adaptive Streaming and TCP", Network And Operating System Support for Digital Audio and Video, Jun. 7-8, 2012, pp. 21-26.

Sieber et al., "Scalable Application- and User-aware Resource Allocation in Enterprise Networks Using End-host Pacing", Nov. 6, 2018, 34 pages.

* cited by examiner

TECHNIQUES FOR CLIENT-CONTROLLED PACING OF MEDIA STREAMING

BACKGROUND

Field of the Various Embodiments

The various embodiments relate generally to streaming video technology and, more specifically, to techniques for client-controlled pacing of media streaming.

Description of the Related Art

A typical media streaming service provides access to a library of media titles that can be viewed on a range of different client devices. Each client device can connect to the media streaming service under different connection conditions. In many implementations, a client device executes a playback application that opens a transmission control protocol (TCP) connection to a media delivery application executing on a server in a content delivery network (CDN). The playback application oftentimes implements an algorithm that attempts to optimize the visual quality experienced during playback of the media title on the client device while avoiding playback interruptions due to re-buffering events. In these types of implementations, for each discrete portion or "chunk" of a media title, the algorithm attempts to select the encoded version of the chunk having the highest quality to stream to the client device based on the current performance of the TCP connection.

Each encoded chunk is delivered over the TCP connection via a stream of packets. Each packet encapsulates a different TCP segment, and each TCP segment encapsulates a different portion of the encoded chunk, The TCP connection can include any number of network links, where a given network link can be shared between any number of connections. In some implementations, if the aggregate rate of packets arriving at a link from all connections exceeds the maximum rate at which the link can transmit packets, then packets are temporarily stored in a network buffer until transmission is possible. As the number of packets stored in the network buffer increases, the latency of each stored packet and of any packets that are stalled behind the stored packets increases. When the network buffer is full, then packets arriving at the link are dropped or "lost" until the aggregate rate of packets arriving at the link falls below the maximum rate at which the link can transmit packets, which allows the network buffer to drain.

The link in the TCP connection having the lowest maximum rate is typically referred to as the "bottleneck" link for the TCP connection, and this bottleneck link imposes an upper bound on the throughput of the TCP connection. In practice, the achievable throughput of the TCP connection can be limited by many other factors in addition to the maximum rate of the bottleneck link or the "bottleneck rate." Some examples of additional factors include, without limitation, network conditions, competing connections, and transport heuristics implemented by TCP to ensure in-order delivery of packets while attempting to deliver the packets as fast as possible.

One drawback of conventional media streaming is that some of the transport heuristics implemented by TCP can trigger re-buffering events. In this regard, to estimate the maximum achievable throughput of a TCP connection over time, many implementations of TCP repeatedly induce packet losses while transmitting the encoded chunks. When a given packet is lost, the playback application can end up receiving packet data associated with a large number of packets once the lost packet is recovered. More specifically, TCP is configured to detect lost packets and then re-transmit those packets once detected. In the meantime, because TCP ensures in-order delivery of packets, TCP prevents a playback application from accessing the data of any packets that arrive at a client device out-of-order with respect to a lost packet. When the lost packet eventually reaches the client device, TCP enables the playback application to access the data associated with the lost packet as well as the data associated with all of the out-of-order packets that were stored pending the recovery and receipt of the lost packet. Accordingly, the playback application can end up processing a potentially large number of bytes of encoded media content within a very short period of time. If the client device has a relatively low-end processor, then the corresponding processor usage spike can overload the processor. As a result, the processor can be unable to perform the media rendering operations required to playback the media title on the client device and a "media" re-buffering event can occur. If a media re-buffering event occurs, then the playback of the media title is interrupted and the QoE (quality of experience) for users of the playback application can be dramatically reduced.

Another drawback of conventional media streaming is that because packets usually are not dropped unless a network buffer is full, inducing packet losses when network buffers are large can substantially increase the latency of packets that traverse a bottleneck link. If a latency-sensitive application relies on a connection that shares the bottleneck link, then the QoE for users of that application can be negatively impacted. For example, critical data associated with voice over IP applications, online gaming services, web browsers, user interfaces to network services, and any other latency-sensitive applications sharing the bottleneck link can become temporarily trapped in backlogs of packets stored in large network buffers. The resulting increase in transmission delays can frustrate the associated users and can even cause the shared network to become unusable for these types of applications.

As the foregoing illustrates, what is needed in the art are more effective techniques for transmitting encoded chunks of media titles over TCP connections.

SUMMARY

One embodiment sets forth a computer-implemented method for transmitting encoded chunks of a media title. The method includes receiving, via a media channel, a first encoded chunk request that has been transmitted over a Transmission Control Protocol (TCP) connection; receiving, via a side channel, a first pacing specification that is associated with the first encoded chunk request and has been transmitted over the TCP connection; retrieving first encoded chunk content that corresponds to the first encoded chunk request; setting a first parameter equal to a first parameter value based on the first pacing specification; and causing TCP segments corresponding to the first encoded chunk content to be transmitted, via the media channel, over the TCP connection in accordance with the first parameter value.

At least one technical advantage of the disclosed techniques relative to the prior art is that, with the disclosed techniques, the rate and spacing with which packets carrying encoded media content are emitted onto a TCP connection during media streaming can be optimized based on the actual needs of a playback application. In that regard, with the disclosed techniques, a side channel enables the playback application to implement different levels of pacing that reduce the burstiness with which packets arrive at the bottleneck link and, as a result, can reduce the number of packet losses. When the playback application is executing on a relatively low-end processor, a reduction in the number of packet losses can result in an overall decrease in re-buffering events. In addition, if the pacing rate of packet emissions is lower than the bottleneck rate, then the latency of packets traversing the bottleneck link can be reduced. The QoE associated with any latency-sensitive applications relying on any connection that shares the bottleneck link can therefore be increased. These technical advantages provide one or more technical advancements over prior art approaches.

BRIEF DESCRIPTION OF THE DRAWINGS

So that the manner in which the above-recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
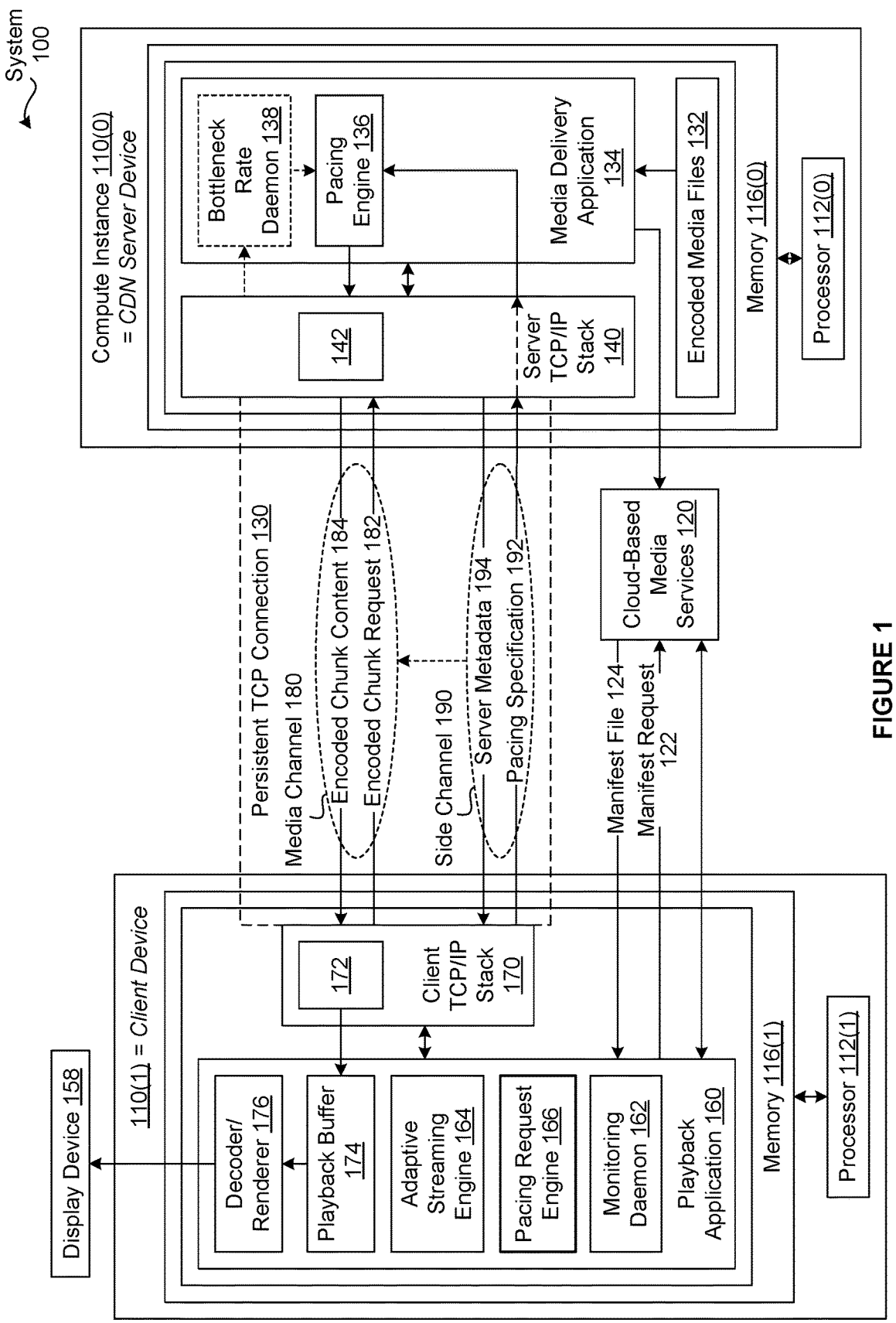
FIG. 1 is a conceptual illustration of a system configured to implement one or more aspects of the various embodiments.

In the following description, numerous specific details are set forth to provide a more thorough understanding of the various embodiments. However, it will be apparent to one skilled in the art that the inventive concepts may be practiced without one or more of these specific details.

To enable a library of media titles to be efficiently delivered to different client devices under a wide range of network conditions, a typical media streaming service stores multiple, pre-generated, encoded versions of each available media title across a CDN. To playback a media title on a client device, a playback application executing on the playback device opens a TCP connection to a media delivery application executing on a server in the CDN. During the playback of the media title, the playback application attempts to incrementally select a sequence of encoded chunks to stream to the client device that optimizes visual quality from the user's perspective without exceeding the throughput of the TCP connection. To deliver each encoded chunk to the client device, the media delivery application causes a server TCP/IP stack to emit a stream of packets onto the TCP connection. Each packet encapsulates a different TCP segment, and each TCP segment encapsulates a different portion of the encoded chunk. A client TCP/IP stack executing on the client device extracts and temporarily stores the bytes of encoded media content carried by the packets. The client TCP/IP stack allows the client application to access the stored bytes of encoded media content in playback order.

One drawback of conventional media streaming is that the server TCP/IP stack controls the inter-response packet emissions according to transport heuristics that can cause temporary stalls during the playback of the media title. For example, many implementations of TCP repeatedly induce packet losses as part of an ongoing attempt to deliver packets as fast as possible. After a packet is lost, the client TCP/IP stack prevents the playback application from accessing the encoded media content associated with any packets received out-of-order with respect to the lost packet until the client device receives a re-transmitted version of the lost packet. When the client device receives the re-transmitted version of the lost packet, the processor usage can spike as the playback application processes a potentially large amount of encoded media content corresponding to the lost packet and all of the out-of-order packets. If the client device has a relatively low-end processor, then the processor can be unable to perform the media rendering operations required to playback the media title on the client device and a media re-buffering event can occur. If a media re-buffering event occurs, then the playback of the media title is interrupted and the QoE (quality of experience) for users of the playback application can be dramatically reduced.

Another drawback of conventional media streaming is that inducing packet losses can substantially increase the latency of packets that traverse the slowest or bottleneck link of the TCP connection. The increase in latency is attributable to a backlog of packets stored in a network buffer preceding the bottleneck link. The network buffer can temporarily store a finite number of "overflow" packets when the bottleneck rate (e.g., the highest rate at which the bottleneck link can transmit data) is exceeded. If a latency-sensitive application relies on a connection that shares the bottleneck link, then the QoE for users of that application can be negatively impacted.

With the disclosed techniques, however, a media delivery application enables a playback application to control the pacing of the packet emissions that deliver each encoded chunk to the playback application. In some embodiments, after selecting an encoded chunk for playback, the playback application transmits a corresponding encoded chunk request and a pacing specification over the TCP connection via a media channel and a side channel, respectively. Based on the pacing specification, the media delivery application sets TCP parameters that control the minimum temporal gap between bursts of one or more TCP segments and the maximum number of TCP segments permitted in each burst. The media delivery application relays the encoded chunk content corresponding to the selected encoded chunk request to the server TCP/Internet Protocol (IP) stack for transmission to the playback application. In response, the server TCP/IP stack partitions the encoded chunk content into TCP segments and emits packets carrying the TCP segments onto the media channel as per the TCP parameters. The resulting packet emissions are approximately evenly spread out over time. Each chunk is optionally accompanied over the TCP connection by server metadata that the media delivery application generates and the server TCP/IP stack transmits via the side channel. The server metadata can include, without limitation, any amount and/or type of data relevant to determining the pacing of packet emissions, such as the packet rate loss of the TCP connection.

The playback application can determine the pacing specification for a given encoded chunk in any technically feasible fashion using any number and/or types of algorithms, heuristics, rules, etc., and based on any amount and/or type of relevant data. In some embodiments, the playback application determines the maximum number of TCP segments permitted per burst or "maximum segments" based on the processing capability of the client device. For example, if the client device has a relatively low-end processor, then the playback application could set the maximum segments equal to one to cause packet emissions to be spread out over time as evenly as possible. In the same or other embodiments, the playback application computes an instantaneous encoding rate of each selected encoded chunk based on the size of the selected encoded chunk and the average encoding rate of the corresponding encoded version of the media title. Based on the instantaneous encoding rate, the amount of encoded media content stored in a playback buffer on the client device, and the packet loss rate, the playback application determines a pacing rate for packet emissions. Typically, the playback application sets the pacing rate such that the amount of media content played back during the transmission and decoding of the encoded chunk is commensurate with the size of the chunk generated when the playback application decodes the encoded chunk. The playback application then computes a minimum temporal gap or "minimum gap" between the bursts of packets based on the maximum segments and the pacing rate.

At least one technical advantage of the disclosed techniques relative to the prior art is that the media delivery application can optimize the rate and spacing with which packets carrying encoded media content are emitted onto a TCP connection during media streaming based on the actual needs of the playback application. In that regard, the side channel enables the playback application to implement different levels of pacing that spread out the arrival of packets at the bottleneck link over time and can reduce the number of packet losses (particularly when competing with other traffic through a shared bottleneck) while enabling uninterrupted playback of the media title. When the playback application is executing on a relatively low-end processor, a reduction in the number of packet losses can result in an overall decrease in re-buffering events. In addition, if the pacing rate is lower than the bottleneck rate, then the latency of packets traversing the bottleneck link can be reduced. The QoE associated with any latency-sensitive applications relying on any connection that shares the bottleneck link can therefore be increased. These technical advantages provide one or more technical advancements over prior art approaches.

System Overview

FIG. 1 is a conceptual illustration of a system 100 configured to implement one or more aspects of the various embodiments. As shown, in some embodiments, the system 100 includes, without limitation, a compute instance 110(0), a compute instance 110(1), a display device 158, and cloud-based media services 120. For explanatory purposes, the compute instance 110(0) and the compute instance 110(1) are also referred to herein individually as "compute instance 110" and collectively as "compute instances 110." In some embodiments, the system 100 can include, without limitation, any number of compute instances 110, any number of display devices, any number and/or types of cloud-based services, or any combination thereof. In the same or other embodiments, the display device 158 and/or the cloud-based media services 120 are omitted from the system 100.

Any number of the components of the system 100 can be distributed across multiple geographic locations or implemented in one or more cloud computing environments (i.e., encapsulated shared resources, software, data, etc.) in any combination. In some embodiments, any number of compute instances 110 can be implemented in a cloud computing environment, implemented as part of any other distributed computing environment, or implemented in a stand-alone fashion.

As shown, the compute instance 110(0) includes, without limitation, a processor 112(0) and a memory 116(0). As also shown, the compute instance 110(1) includes, without limitation, a processor 112(1) and a memory 116(1). For explanatory purposes, the processor 112(0) and the processor 112(1) are also referred to herein individually as "the processor 112" and collectively as "the processors 112." For explanatory purposes, the memory 116(0) and the memory 116(1) are also referred to herein individually as "the memory 116" and collectively as "the processors 116."

Each processor 112 can be any instruction execution system, apparatus, or device capable of executing instructions. For example, each processor 112 could comprise a central processing unit, a graphics processing unit, a controller, a microcontroller, a state machine, or any combination thereof. The memory 116 of each compute instance 110 stores content, such as software applications and data, for use by the processor 112 of the compute instance 110. In some embodiments, each compute instance 110 can include any number of processors 112 and any number of memories 116 in any combination. In particular, any number of compute instances 110 (including one) can provide any number of multiprocessing environments in any technically feasible fashion.

Each memory 116 can be one or more of any readily available memory, such as random access memory, read-only memory, floppy disk, hard disk, or any other form of digital storage, local or remote. In some embodiments, a storage (not shown) may supplement or replace any number of memories 116. The storage can include any number and/or types of external memories that are accessible to any number of processors 112. For example, and without limitation, the storage can include a Secure Digital Card, an external Flash memory, a portable compact disc read-only memory, an optical storage device, a magnetic storage device, or any suitable combination of the foregoing.

As depicted in italics, in some embodiments, the compute instance 110(0) is one of multiple CDN server devices in a content delivery network (CDN) that stores encoded media content for a library of media titles and streams the encoded media content to clients of a streaming media service. Each media title can include, without limitation, any amount of audio content, any amount of video content, or any combination thereof. Examples of media titles include, without limitation, feature-length films, episodes of television programs, music videos, and podcasts, to name a few. The CDN can store any amount and/or type of encoded media content in any technically feasible fashion.

In some embodiments, the CDN stores multiple pre-encoded versions of each media title as separate files. Each pre-encoded version of a media title typically corresponds to a different combination of average bitrate and resolution or "bitrate-resolution pair" and is associated with a different average quality level. A set of distinct bitrate-resolution pairs for a media title is referred to herein as an "encode rate ladder" for the media title. Storing multiple pre-encoded versions of a media title increases the likelihood that the media title can be streamed over a TCP connection to a client without playback interruptions, irrespective of the achievable throughput of the TCP connection. "Lower-quality" encodings usually are streamed to a client when the achievable throughput of the TCP connection is relatively low, and "higher-quality" encodings usually are streamed to the client when the achievable throughput of the TCP connection is relatively high.

In the same or other embodiments, the cloud-based media services 120 includes, without limitation, microservices, databases, and storage for activities and content associated with the streaming media service that are allocated to neither the CDN nor the clients. Some examples of functionality that the cloud-based media services 120 can provide include, without limitation, login and billing, personalized media title recommendations, video transcoding, server and connection health monitoring, and client-specific CDN guidance.

In some embodiments, the compute instance 110(1) is a client device that supports a Hypertext Transfer Protocol (HTTP), TCP, and IP and can playback media content via the display device 158. The display device 158 can be any type of device that can be configured to display any amount and/or type of visual content in any technically feasible fashion. In the same or other embodiments, the compute instance 110(1), zero or more other compute instances, the display device 158, and zero or more other display devices are integrated into a user device (not shown). Some examples of user devices include, without limitation, desktop computers, laptops, smartphones, smart televisions, game consoles, tablets, etc.

Each compute instance 110 is configured to implement one or more software applications. For explanatory purposes only, each software application is depicted as residing in the memory 116 of a single compute instance 110 and executing on a processor 112 of the single compute instance 110. However, as persons skilled in the art will recognize, the functionality of each software application can be distributed across any number of other software applications that reside in the memories 116 of any number of compute instances 110 and execute on the processors 112 of any number of compute instances 110 in any combination. Further, the functionality of any number of software applications can be consolidated into a single application or subsystem.

In some embodiments, the compute instance 110(0) is configured to implement, without limitation, a media delivery application 134 and a server TCP/IP stack 140. As shown, the media delivery application 134 and the server TCP/IP stack 140 reside in the memory 116(0) of the compute instance 110(0) and execute on the processor 112(0) of the compute instance 110(0). The media delivery application 134 is a CDN server for a streaming media service, and the server TCP/IP stack 140 enables the media delivery application 134 to communicate with other devices via a collection of protocols that include, without limitation, TCP and IP.

In the same or other embodiments, the compute instance 110(1) is configured to implement, without limitation, a playback application 160 and a client TCP/IP stack 170. As shown, the playback application 160 and the client TCP/IP stack 170 reside in the memory 116(1) of the compute instance 110(1) and execute on the processor 112(1) of the compute instance 110(1). The playback application 160 allows users to select and playback portions of media titles on the display device 158, and the client TCP/IP stack 170 enables the playback application 160 to communicate with other devices via a collection of protocols that includes, without limitation, TCP and IP.

In some embodiments, the media delivery application 134 opens one or more TCP connections to the cloud-based media services 120, The TCP connections between the media delivery application 134 and the cloud-based media services 120 enable the cloud-based media services 120 to monitor the health of the compute instance 110(0) and associated connections. In some embodiments, the media delivery application 134 can transmit to and/or receive from the cloud-based media services 120 any amount (including none) and/or types of data in any technically feasible fashion.

In the same or other embodiments, the playback application 160 opens one or more TCP connections to the cloud-based media services 120 that allow a user of the media delivery application 134 to select a media title for streaming to the compute instance 110(1). In some embodiments, the playback application 160 can transmit to and/or receive from the cloud-based media services 120 any amount (including none) and/or types of data in any technically feasible fashion.

In some embodiments, after the user selects a media title for streaming, the playback application 160 sends a manifest request 122 specifying the selected media title to the cloud-based media services 120. In response, the cloud-based media services 120 generate a manifest file 124 based on the selected media title, optionally the CDN, and optionally the computer instance 110(1). The cloud-based media services 120 transmits the manifest file 124 to the playback application 160. In some embodiments, the manifest request 122 is an HTTP request and the manifest file 124 is encapsulated in an HTTP response.

In the same or other embodiments, the manifest file 124 specifies, without limitation, the bitrate-resolution pair and the average quality level associated with each pre-encoded version of the selected media title and the locations of encoded chunks of the pre-encoded versions of the selected media title on each of one or more CDN server devices that are proximate to the compute instance 110(1). As shown, in some embodiments, the one or more CDN server devices include, without limitation, the compute instance 110(0).

Each encoded chunk is an encoded version of a chunk of the selected media title. Each chunk of the selected media title represents a different non-overlapping period of playback of the selected media title. Different encoded chunks corresponding to the same chunk of the selected media title are encoded at different bitrate/resolution pairs and therefore include a different number of bytes. Furthermore, in some embodiments, variable bitrate encoding is used to generate the encoded versions of the selected media title. Consequently, the instantaneous bitrate of each encoded chunk within each encoded version of the selected media title can vary from the average bitrate of the encoded version of the selected media title.

In some embodiments, before playing back any portion of the selected media title on the compute instance 110(1), the playback application 160 opens a persistent TCP connection 130 to the media delivery application 134. The persistent TCP connection 130 is a network communication channel that remains open for multiple HTTP requests/responses. As used herein, an HTTP request/response refers to a single HTTP request and the corresponding HTTP response. By contrast, a non-persistent TCP connection automatically closes after a single HTTP request/response. In some embodiments, the playback application 160 can open any number and/or types of TCP connections to any number of servers instead of or in addition to opening the persistent TCP connection 130, and the techniques described herein are modified accordingly. For instance, in some embodiments, the playback application 160 opens multiple TCP connections to multiple CDN servers, where the TCP connections can be persistent, nonpersistent, or a combination of persistent and non-persistent.

Subsequently, in some embodiments, an adaptive streaming engine 164 that is included in the playback application 160 selects a sequence of encoded chunks of the selected media title for transmission from the media delivery application 134 to the playback application 160 over the persistent TCP connection 130. The sequence of encoded chunks is a sequence of encoded versions of chunks of the selected media title in playback order. When selecting the sequence of encoded chunks, the adaptive streaming engine 164 attempts to optimize the visual quality experienced during playback of the selected media title on the compute instance 110(1) while avoiding playback interruptions due to re-buffering events. More specifically, for each chunk of the selected media title, the adaptive streaming engine 164 attempts to select the highest possible quality encoded version of the chunk based on the current performance of the persistent TCP connection 130.

In some embodiments, for each selected encoded chunk, the playback application 160 issues an encoded chunk request 182 to the media delivery application 134 over the persistent TCP connection 130. In some embodiments, the encoded chunk request 182 is an HTTP GET range request that targets the bytes corresponding to the selected encoded chunk in the file storing the corresponding encoded version of the selected media title. In response to the encoded chunk request 182, the media delivery application 134 retrieves the targeted bytes of encoded media content from encoded media files 132. The targeted bytes of encoded media content are also collectively referred to herein as "encoded chunk content 184." The media application 134 then constructs an HTTP response (not shown) that specifies the encoded chunk content 184 and relays the HTTP response to the server TCP/IP stack 140. In some embodiments, the server TCP/IP stack 140 directs the encoded chunk content 184 to a TCP transmit buffer 142 included in the server TCP/IP stack 140.

The server TCP/IP stack 140 partitions the encoded chunk content 184 into TCP payloads and wraps each TCP payload with TCP header information to generate a corresponding TCP segment. The number of TCP segments that the server TCP/IP stack 140 generates for each encoded chunk depends on the size of the encoded chunk and therefore the size of the encoded chunk content 184. For example, the server TCP/IP stack 140 could generate 1500 TCP segments for a two Mbyte encoded chunk. The server TCP/IP stack 140 wraps each TCP segment with IP header information to generate a corresponding packet. To transmit each packet from the compute instance 110(0) to the compute instance 110(1), the server TCP/IP stack 140 emits the packet onto the persistent TCP connection 130.

The client TCP/IP stack 170 receives packets that are transmitted over the persistent TCP connection 130. As the client TCP/IP stack 170 receives the packets, the client TCP/IP stack 170 strips the IP header information and the TCP header information from the packets. As shown, in some embodiments, the client TCP/IP stack 170 stores the resulting TCP payloads in a TCP receive buffer 172 included in the client TCP/IP stack 170. The client TCP/IP stack 170 allows the playback application 160 to access the bytes that make up the TCP payloads stored in the TCP receive buffer 172 in the same order in which the corresponding packets were emitted onto the persistent TCP connection 130 by the server TCP/IP stack 140.

As described previously herein, the persistent TCP connection 130 includes, without limitation, any number of network links that can each be shared between any number of connections. In some embodiments, each link can be preceded by a network buffer. If the aggregate rate of packets arriving at a link exceeds the maximum rate at which the link can transmit packets at any given time, then packets are temporarily stored in the preceding network buffer unless the preceding network buffer is full. As the number of packets stored in the network buffer increases, the latency of each stored packet and of any packets that are stalled behind the stored packets increases. By contrast, if the maximum rate at which the link can transmit packets exceeds the aggregate rate of packets arriving at the link at any given time, then the number of packets stored in the network buffer decreases as packets are drained from the network buffer and transmitted over the link. And if a network buffer preceding a link is full, packets arriving at the link are dropped or lost until the network buffer begins to drain.

As persons skilled in the art will recognize, TCP relies on acknowledgments or "ACKs" to confirm which of the TCP segments corresponding to each HTTP request (e.g., the encoded chunk request 182) have been successfully delivered over a TCP connection at any given point in time. In some implementations of TCP, when a server TCP/IP stack receives an ACK from a client TCP/IP stack that confirms the successful delivery of one or more TCP segments, the server TCP/IP stack encapsulates new TCP segments in new packets and emits the new packets onto the persistent TCP connection 130. In the same or other embodiments, to reduce idle periods and improve performance, TCP allows multiple TCP segments to be emitted or sent but not yet ACKed at any given time. A TCP segment that is sent but not yet ACKed is referred to herein as "inflight." The number of TCP segments that TCP allows inflight is referred to herein as a "send window."

In many embodiments, TCP also relies on the presence of ACKs, the absence of ACKs, or both to detect and/or infer when a packet is lost. For instance, in some implementations of TCP, a server TCP/IP stack infers packet loss when successive ACKs repeat themselves, ACKs explicitly identify gaps in the sequence of TCP segments received by a client TCP/IP stack, ACKs do not arrive in a timely manner, or any combination thereof.

Because TCP guarantees lossless delivery, if a server TCP/IP stack infers that a packet sent over a TCP connection to a client TCP/IP stack is lost, then the server TCP/IP stack re-transmits the packet over the TCP connection. Meanwhile, the client TCP/IP stack stores the bytes corresponding to TCP segments received over the persistent TCP connection in a TCP receive buffer. Importantly, the client TCP/IP stack prevents the client from accessing any bytes that are out-of-order with respect to the lost packet. During the time between when the packet is lost and when the packet is successfully delivered to the client, the flow of bytes to the client is therefore stalled. Upon receiving the previously lost packet, the client TCP/IP stack places the packet at the head of the TCP receive buffer and allows the client to access all in-order bytes stored in the TCP receive buffer. Accordingly, packet losses over the persistent TCP connection 130 cause the playback application 160 to experience a stall in the flow of bytes of encoded media content followed by a burst of bytes of encoded media content.

In some embodiments, to reduce the likelihood of a temporary degradation or interruption in a TCP connection (e.g., the persistent TCP connection 130) causing a playback interruption, the playback application 160 includes, without limitation, a playback buffer 174. In the same or other embodiments, the playback buffer 174 buffers one or more encoded chunks before playing back the selected media title. More precisely, the playback application 160 retrieves the bytes stored in the TCP receive buffer 172 as the client TCP/IP stack 170 makes the bytes available to the playback application 160. The playback application 160 then stores the retrieved bytes in the playback buffer 174 in the order in which the bytes were made available to the playback application 160. The playback application 160 waits until several encoded chunks are stored in the playback buffer 174 before initiating the playback of the selected media title. In this fashion, the encoded chunks stored in the playback buffer 174 form a reserve that helps prevent instances of buffer under-run that can trigger re-buffering events and associated playback interruptions.

As shown, in some embodiments, a decoder/renderer 176 decodes, in playback order, encoded chunks that are stored in the playback buffer 174. After decoding each encoded chunk, the decoder/render 176 renders the resulting reconstructed chunk to the display device 158, thereby playing back the selected media title chunk-by-chunk.

The link in the persistent TCP connection 130 having the lowest maximum rate is the bottleneck link for the persistent TCP connection 130, and the corresponding bottleneck rate imposes an upper bound on the throughput of the persistent TCP connection 130. In addition to the bottleneck rate, the achievable throughput of the persistent TCP connection 130 can be limited by many other factors. Some examples of additional limiting factors include, without limitation, network conditions, competing connections, and transport heuristics implemented by TCP to ensure in-order delivery of packets while attempting to deliver the packets as fast as possible. As referred to herein, a "competing connection" is any connection that shares the bottleneck link with the persistent TCP connection 130.

As described previously herein, one drawback of conventional media streaming is that some of the transport heuristics implemented by many implementations of TCP can trigger re-buffering events that interrupt the playback of a media title. More precisely, because of packet losses repeatedly induced by the transport heuristics, a playback application can repeatedly receive access to and therefore end up processing a potentially large number of bytes of encoded media content within a very short period of time. If the client device has a relatively low-end processor, then the corresponding processor usage spike can overload the processor and cause media rendering operations to stall. If media rendering operations stall, a media re-buffering event can occur. If a media re-buffering event occurs, then the playback of the media title is interrupted and the QoE for users of the playback application can be reduced. Another drawback of conventional media streaming is that because packets usually are not dropped unless a network buffer is full, inducing packet losses when network buffers are large can substantially increase the latency of packets that traverse a bottleneck link. If a latency-sensitive application relies on a connection that shares the bottleneck link, then the QoE for users of that application can be negatively impacted.

Client-Controlled Pacing of Packets Transmitted Over TCP Connections

To address the above problems, in some embodiments, a pacing engine 136 enables client-controlled pacing of packets transmitted to the playback application 160 over the persistent TCP connection 130. As referred to herein, "pacing" refers to spreading the emission of packets or "packet emissions" onto a TCP connection over time. And "client-controlled pacing" refers to temporally pacing the packets emitted by a server onto a TCP connection for transmission to a client based, at least in part, on pacing input received from the client. In some embodiments, a pacing engine 136 enables a pacing request engine 166 to control the pacing of packets delivering encoded media content over the persistent TCP connection at any level of granularity (e.g., per encoded chunk). The server TCP/IP stack 140 can include, without limitation, and/or utilize any amount of functionality that enables any type of segment-by-segment pacing in any technically feasible fashion.

The pacing engine 136 can be implemented in any technically feasible fashion. As shown, in some embodiments, the pacing engine 136 is included in the media delivery application 134. In some other embodiments, the pacing engine 136 is included in the server TCP/IP stack 140, and the techniques described herein are modified accordingly. In yet other embodiments, any amount of the functionality described herein with respect to the pacing engine 136 can be implemented across any number and/or types of software programs (e.g., the media delivery application 134, the server TCP/IP stack 140, etc.), and the techniques described herein are modified accordingly.

The pacing request engine 138 can be implemented in any technically feasible fashion. As shown, in some embodiments, the pacing request engine 138 is included in the playback application 160. In some other embodiments, the pacing request engine 138 is included in the adaptive streaming engine 164, and the techniques described herein are modified accordingly. In yet other embodiments, any amount of the functionality described herein with respect to the pacing request engine 138 can be implemented across any number and/or types of software programs (e.g., playback application 160, the adaptive streaming engine 164, etc.), and the techniques described herein are modified accordingly.

Figure 2:
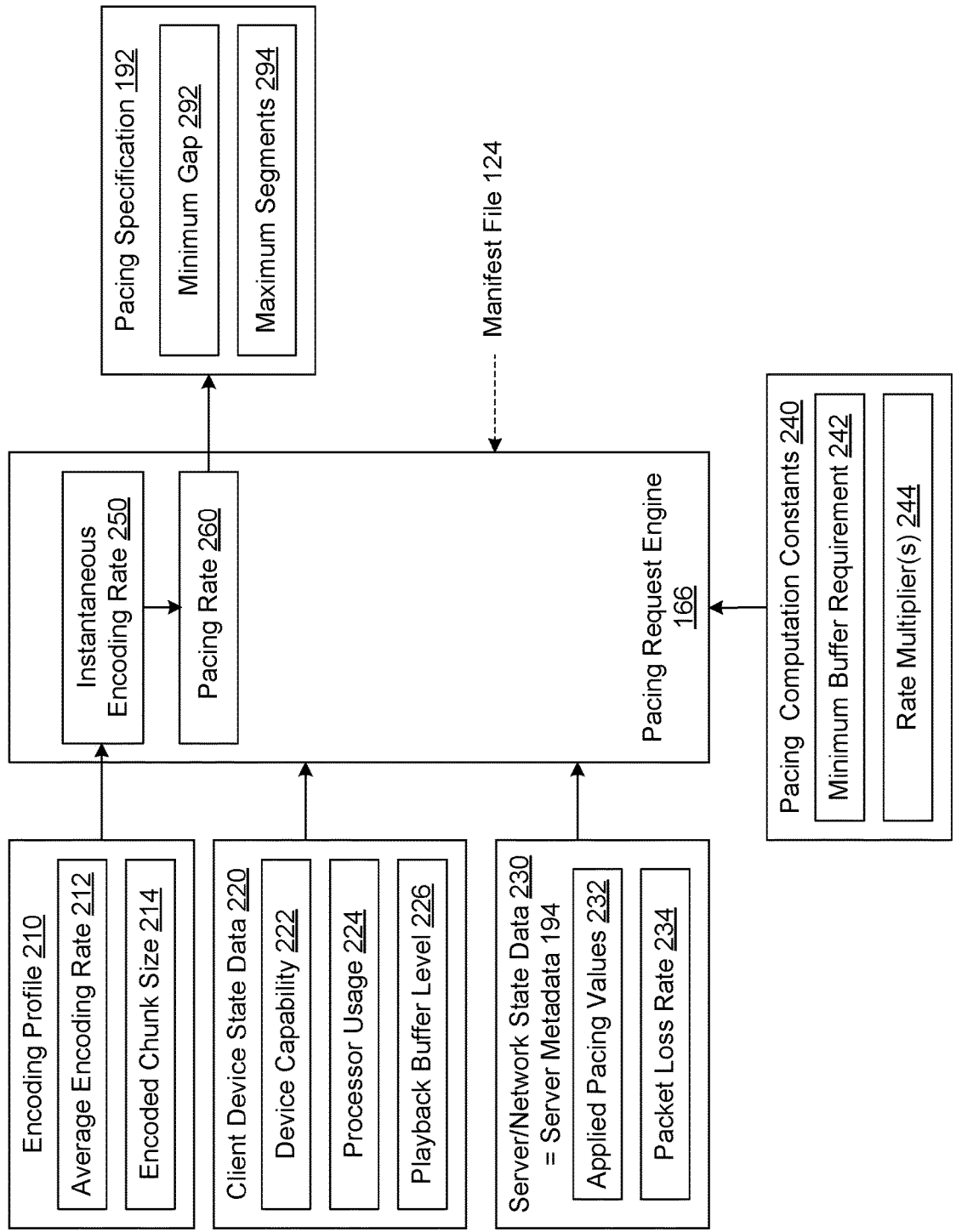
FIG. 2 is a more detailed illustration of the pacing request engine of FIG. 1, according to various embodiments.

For explanatory purposes, FIG. 2 depicts communications over the persistent TCP connection 130 associated with the client-controlled pacing for the encoded chunk request 182. As shown, in some embodiments, the pacing request engine 166 generates a pacing specification 192 for the encoded chunk request 182. The pacing specification 192 includes, without limitation, any amount and/or type of data describing any aspects of pacing that are to be applied to packets carrying the encoded chunk content 184 to the playback application 160. The playback application 160 causes the client TCP/IP stack 170 to transmit the encoded chunk request 182 and the pacing specification 192 to the media delivery application 134 over the persistent TCP connection 130 via a media channel 180 and a side channel 190, respectively.

In response, in some embodiments, a pacing engine 136 included in the media delivery application 134 configures the server TCP/IP stack 140 to implement the pacing specification 192. The media delivery application 134 causes the server TCP/IP stack 140 to transmit the encoded chunk content 184 and optionally any amount and/or type of server metadata 194 over the persistent TCP connection 130 via the media channel 180 and the side channel 190, respectively. Because the server TCP/IP stack 140 is configured to implement the pacing specification 192, the server TCP/IP stack 140 paces the emissions of the packets carrying the encoded chunk content 184 over the persistent TCP connection 130 via the media channel 180 as per the pacing specification 192.

Note that the techniques described herein are illustrative rather than restrictive. Many modifications and variations will be apparent to those of ordinary skill in the art without departing from the scope and spirit of the described embodiments and techniques. In that regard, and for explanatory purposes, the client-controlled pacing of packets emitted by a server TCP/IP stack onto a TCP connection is described in the context of pacing packets conveying encoded media content from the media delivery application 134 to the playback application 160 over the persistent TCP connection 130 based, at least in part, on per-chunk pacing specifications. More generally, the techniques described herein can be used to perform receiver-controlled pacing at any level of granularity when transferring any amount and/or type of data between any "sender" software application and any "receiver" software application over any number and/or types of TCP connections.

In some embodiments, the media channel 180 is a standard HTTP transport channel that enables two-way communication between the playback application 160 and the media delivery application 134 via HTTP requests and HTTP responses. In the same or other embodiments, the side channel 190 is a set of one or more non-standard extensions to HTTP that enable the playback application 160 and the media delivery application 134 to embed information in one or more different types of HTTP messages (e.g., HTTP requests and/or HTTP responses). In some embodiments, the side channel 190 enables the playback application 160 and the media delivery application 134 to communicate encoded metadata, metadata, or both through Uniform Resource Locators (URLs) and/or HTTP headers. Importantly, any encoded metadata and any metadata added or "packed" onto the media channel 180 via the side channel 190 has no impact on HTTP. In some embodiments, server metadata 194 is included in HTTP overhead at the beginning of the encoded chunk content 184 for each chunk. In the same or other embodiments, the server metadata 194 corresponding to a given chunk occupies the payloads of a relatively small subset of the packets making up the chunk.

In some embodiments, the pacing request engine 166, the pacing engine 136, and the server TCP/IP stack 140 collectively institute any number and/or types of requirements, constraints, definitions, parameters, nomenclature, semantics, and the like, that can be used to control how the server TCP/IP stack 140 paces packets. In the same or other embodiments, the pacing engine 136 can implement any number and/or types of techniques that enable the pacing request engine 166 to control one or more aspects of how the server TCP/IP stack 140 paces packet emissions via one or more definitions, parameter values, etc., included in a pacing specification.

For instance, in some embodiments, each pacing specification specifies, without limitation, a lower bound on the temporal gap between bursts of one or more TCP segments or "minimum gap," a maximum number of TCP segments permitted in each burst or "maximum segments," or both. As referred to herein, a burst of TCP segments refers to one or more TCP segments that are emitted onto a TCP connection back-to-back or in a relatively short period of time compared to the temporal gap between bursts of TCP emissions. The temporal gap between bursts of TCP emissions refers to the period of time between the emission of the last TCP segment included in a burst of TCP segments onto the TCP connection and the emission of the first TCP segment included in the next (with respect to time) burst of TCP segments onto the TCP connection.

As persons skilled in the art will recognize, imposing a lower bound on the gap between bursts of TCP segments and a maximum number of TCP segments permitted in each burst imposes a maximum pacing rate (e.g., 12 Mbps). Accordingly, in some embodiments, each pacing specification specifies, without limitation, a pacing rate instead of a lower bound on the temporal gap between bursts of one or more TCP segments, a maximum number of TCP segments permitted in each burst, or both.

As described in greater detail below in conjunction with FIG. 2, in some embodiments, the pacing request engine 166 optionally generates a different pacing specification for each encoded chunk that is selected for streaming by the adaptive streaming engine 164. In some other embodiments, the pacing request engine 166 can generate any number of pacing specifications at any number of levels of granularity, and the techniques described herein are modified accordingly.

The pacing request engine 166 can determine whether to generate a pacing specification for each selected encoded chunk in any technically feasible fashion and based on any amount and/or type of data. The pacing request engine 166 can generate a pacing specification for a selected encoded chunk in any technically feasible fashion and based on any amount and/or type of data. Advantageously, the pacing request engine 166 can take advantage of data that is available to neither the media delivery application 134 nor the server TCP/IP stack 140 to customize each pacing specification based on the state of the playback application 160, the state of the client device, or capabilities of the client device, or any combination thereof.

For instance, in some embodiments, the pacing request engine 166 generates the pacing specification for a given encoded chunk based on an associated encoding profile (not shown in FIG. 1), any amount and/or type of client device state data (not shown in FIG. 1), any amount and/or type of server/connection state data (not shown in FIG. 1), or any combination thereof. The pacing request engine 166 can acquire the encoding profile, client device state data, and server/network state data, in any technically feasible fashion.

In some embodiments, the encoding profile includes, without limitation, any amount and/or type of data associated with the selected encoded chunk. In some embodiments, the encoding profile enables the pacing request engine 166 to accurately assess any number and/or types of chunk-specific needs associated with the playback application 160. In the same or other embodiments, the pacing request engine 166 tailors the pacing specification to optimize the QoE of the playback application 160 based on chunk-specific needs. In some embodiments, the pacing request engine 166, the adaptive streaming engine 164, the playback application 160, or any combination thereof generate the encoding profile based on the manifest file 124 and data provided by the adaptive streaming engine 164.

As shown, in some embodiments, the client device state data is generated by a monitoring daemon 162 that is included in the playback application 160. In some embodiments, the playback application 160 starts the monitoring daemon 162 before the adaptive streaming engine 164 selects any encoded chunks for streaming to the compute instance 110(1). The monitoring daemon 162 can determine and/or monitor any number and/or types of aspects of the compute instance 110(1), the playback application 160, or both in any technically feasible fashion. In some embodiments, the server/connection state data is the most recent version of server metadata (e.g., the server metadata 194) transmitted from the media delivery application 134 to the playback application 160 over the persistent TCP connection 130 via the side channel 190.

In some embodiments, the pacing request engine 166 institutes a pacing rate for the persistent TCP connection 130 that can vary over time and allows the playback application 160 to achieve target QoEs without unnecessarily reducing the transmission rates of other competing TCP connections and/or wasting network resources. For instance, in some embodiments, if the playback application 160 is starting to playback a new media title or is recovering from a re-buffer event, then the pacing request engine 166 generates a pacing specification corresponding to a relatively high pacing rate. In the same or other embodiments, if the level of the playback buffer 174 is relatively high, then the playback application 160 generates a pacing specification corresponding to a relatively low pacing rate that results in an overall decrease in the level of the playback buffer 174 and does not unnecessarily consume network resources. By contrast, TCP transport heuristics typically attempt to maximize transmission rates without taking into account the actual needs of clients. As a result, TCP transport heuristics can unnecessarily increase network congestion and waste network resources.

The media delivery application 134 enables client-controlled pacing and optionally supplements the client-controlled pacing with server-controlled pacing in any technically feasible fashion and at any level of granularity. In some embodiments, if the media delivery application 134 receives an encoded chunk request over the persistent TCP connection 130 via the media channel 180 but does not receive a corresponding pacing specification over the persistent TCP connection 130 via the side channel 190, then the pacing engine 136 implements server-based pacing. In some embodiments, the pacing engine 136 implements server-based pacing as a default, and implements client-controlled pacing when implementing a corresponding pacing specification would result in a lower pacing rate than implementing the server-based pacing. The pacing engine 136 can implement server-based pacing in any technically feasible fashion.

As indicated via a dashed box, in some embodiments, the pacing engine 136 determines a server-specified pacing rate based on an estimate of the bottleneck rate of the persistent TCP connection 130 that is repeatedly re-computed over time by a bottleneck rate daemon 138 included in the media delivery application 134. The pacing engine 136 then configures the server TCP/IP stack 140 to implement the server-specified pacing rate in any technically feasible fashion. In some embodiments, the media delivery application 134 starts the bottleneck rate daemon 138 when the persistent TCP connection 130 is established. The bottleneck rate daemon 138 can estimate the bottleneck rate in any technically feasible fashion. For instance, in some embodiments, the bottleneck rate daemon 138 estimates the bottleneck rate based on data (e.g., per acknowledgement statistics) received from the server TCP/IP stack 140.

In some embodiments, the bottleneck rate daemon 138 is implemented within the server TCP/IP stack 140 instead of the media delivery application 134, and the techniques described herein are modified accordingly. In yet other embodiments, any amount of the functionality described herein with respect to the bottleneck rate daemon 138 can be implemented across any number and/or types of software programs (e.g., the media delivery application 134, the server TCP/IP stack 140, etc.), and the techniques described herein are modified accordingly.

In some embodiments, if the media delivery application 134 receives a pacing specification over the persistent TCP connection 130 via the side channel 190, then the pacing engine 136 configures the server TCP/IP stack 140 to implement the pacing specification or a modified version of the pacing specification for the corresponding encoded chunk. The pacing engine 136 can determine whether to modify the pacing specification based on the pacing specification and/or any amount (including none) of additional data.

For instance, as persons skilled in the art will recognize, as the maximum number of TCP segments permitted in each burst decreases, the load on the processor 112(0) increases. Accordingly, in some embodiments, if the load on the processor 112(0) exceeds a maximum threshold, then the pacing engine 136 modifies any number of pacing specifications to increase the maximum number of TCP segments while retaining the pacing rate.

The pacing engine 136 can configure the server TCP/IP stack 140 to implement each pacing specification or a corresponding modified pacing specification in any technically feasible fashion. For explanatory purposes, the functionality of the pacing engine 136 concerning configuring the server TCP/IP stack 140 is described in more detail herein in the context of implementing the pacing specification 192.

In some embodiments, before the media delivery application 134 submits an HTTP response specifying the encoded chunk content 184 to the server TCP/IP stack 140, the pacing engine 136 sets the values of one or more TCP parameters associated with the server TCP/IP stack 140 based on the pacing specification 192. The values of the TCP parameters or "TCP parameter values" can control how the server TCP/IP stack 140 paces packet emissions in any technically feasible fashion. Based on the TCP parameter values, the server TCP/IP stack 140 emits the packets carrying the encoded chunk content 184 onto the persistent TCP connection 130 as per the pacing specification 192.

The pacing engine 136 can set the values of any number of TCP parameters in any technicality feasible fashion. In some embodiments, the pacing engine 136 sets one or more TCP parameter values equal to one or more corresponding parameter values included in the pacing specification 192. In the same or other embodiments, the media delivery application 134 computes one or more TCP parameter values based on the pacing specification 192 and any amount (including none) and/or types of other data. For instance, in some embodiments, the pacing request engine 166 computes a value for a TCP parameter specifying a lower bound on the gap between bursts of TCP segments based on a pacing rate specified in the pacing specification 192.

In some embodiments, when the media delivery application 134 transmits encoded chunk content over the media channel 180, the media delivery application 134 transmits any amount and/or type of server metadata (e.g., the server metadata 194) over the side channel 190. The media delivery application 134 can transmit server metadata over the side channel 190 in any technically feasible fashion. For instance, in some embodiments, the media delivery application 134 causes the server TCP/IP stack 140 to emit server metadata onto the persistent TCP connection 130 via the side channel 190.

The server metadata can include, without limitation, any amount and/or type of data that reflect any number of aspects of the compute instance 110(0), the CDN, any number of TCP connections, or any combination thereof. In some embodiments, the server metadata 194 can include, without limitation, any amount and/or type of data that the pacing request engine 166 uses to generate one or more subsequent pacing specifications.

In some embodiments, the server metadata includes, without limitation, any number of values of performance metrics or "performance metric values" for the compute instance 110(0), any number of performance metric values for the persistent TCP connection 130, any number of applied pacing values, or any combination thereof. An example of a performance metric value for the compute instance 110(0) is the usage of the processor 112(0). An example of a performance metric value for the persistent TCP connection 130 is the packet loss rate specifying the fraction of the total packets emitted by the server TCP/IP stack 140 over the persistent TCP connection 130 that were dropped before reaching the client TCP/IP stack 170. As used herein, an "applied pacing value" is one of the TCP parameter values that is set by the pacing engine 136 to configure the pacing of the persistent TCP connection 130. Accordingly, each applied pacing value reflects any modifications that the pacing engine 136 makes to pacing specifications.

It will be appreciated that the system 100 shown herein is illustrative and that variations and modifications are possible. For example, the functionality provided by the adaptive streaming engine 164 and the pacing request engine 166 as described herein can be integrated into or distributed across any number of software applications and any number of components of the system 100. Further, the connection topology between the various units in FIG. 1 may be modified as desired.

FIG. 2 is a more detailed illustration of the pacing request engine 166 of FIG. 1, according to various embodiments. As shown, in some embodiments, the pacing request engine 166 generates the pacing specification 192 based on pacing computation constants 240, an encoding profile 210, client device state data 220, server/network state data 230, pacing computation constants 240, and optionally the manifest file 124. Referring back to FIG. 1, the pacing specification 192 is associated with the encoded chunk request 182 and influences the pacing of the packets that carry the encoded chunk content 184 from the media delivery application 134 to the playback application 160 over the persistent TCP connection 130.

As shown, in some embodiments, the pacing specification 192 includes, without limitation, a minimum gap 292 and a maximum segments 294. As described previously herein in conjunction with FIG. 1, the minimum gap 292 specifies a minimum temporal gap between bursts of one or more TCP segments, and the maximum segments 294 specifies a maximum number of TCP segments in each burst. In some other embodiments, the minimum gap 292 can be replaced with a pacing rate 260. In the same or other embodiments, the pacing rate 260 specifies a maximum packet emission rate. In the same or other embodiments, the pacing request engine 166 optionally specifies the maximum segments 294. In some embodiments, the pacing specification 192 can specify any number and/or types of value for any number and/or types of TCP parameters that can be used to influence one or more aspects of packet emission pacing.

In particular, in some embodiments, the server TCP/IP stack 140 includes, without limitation, separate TCP parameters for pacing during slow start, congestion avoidance, and recovery modes. As persons skilled in the art will recognize, the characteristic behavior and the impact of pacing on the characteristic behavior of a TCP connection can vary based on whether the TCP connection is in the slow start, the congestion avoidance, or the recovery modes. Accordingly, in some embodiments, the pacing request engine 166 specifies, without limitation, a set of one or more pacing values (e.g., a minimum gap and a maximum segments) for each of the slow start, congestion avoidance, and recovery modes.

The pacing computation constants 240 include any number of constants that can influence whether the pacing request engine 166 generates a pacing specification for a given encoded chunk, the content of the pacing specification 192, or both. As shown, in some embodiments, the pacing computation constants 240 include, without limitation, a minimum buffer requirement 242 and rate multiplier(s) 244. The minimum buffer requirement 242 specifies a threshold for a playback buffer level 226 below which the pacing request engine 166 does not generate a pacing specification. The playback buffer level 226 specifies the current level of the playback buffer 174 (e.g., seven seconds of playback time). In some embodiments, if the pacing request engine 166 does not generate a pacing specification for a given encoded chunk, then the server TCP/IP stack 140 attempts to send packets as quickly as possible. Sending packets as quickly as possible can be the desired behavior when the playback buffer level 226 is below the minimum buffer requirement 242, In some embodiments, the rate multiplier(s) 244 include, without limitation, one or more multipliers that provide an error buffer and/or institute a level of aggressiveness when computing the pacing specification 192. For instance, in some embodiments, the pacing request engine 166 computes a baseline rate (not shown) based on an estimate of the needs of the playback application 160 and then multiplies the baseline rate by a single multiplier that is included in the rate multiplier(s) 244 to generate a pacing rate 260. In some other embodiments, the pacing request engine 166 computes the baseline rate and then multiplies the baseline rate by each of three multipliers included in the rate multiplier(s) 244 to generate separate pacing rates for the slow start, the congestion avoidance, and the recovery modes.

As shown, in some embodiments, the encoding profile 210 specifies, without limitation, an average encoding rate 212 and an encoded chunk size 214. The average encoding rate 212 is the encoding rate specified in the manifest file 124 for the encoded version of the selected media title that includes the encoded chunk specified in the encoded chunk request 182. The encoded chunk size 214 is the size of the encoded chunk specified in the encoded chunk request 182. In some embodiments, the encoding profile 210 can specify any amount and/or type of data that are associated with the encoded chunk specified in the encoded chunk request 182 instead of or in addition to the average encoding rate 212, the encoded chunk size 214, or both.

As shown, in some embodiments, the client device state data 220 includes, without limitation, a device capability 222, a processor usage 224, and the playback buffer level 226. The device capability 222 specifies a capability of the processor 112(1) (e.g., low-end processor). The processor usage 224 specifies a current usage of the processor 112(1).

In some other embodiments the client device state data 220 can include, without limitation, any amount and/or type of other state data instead of or in addition to the device capability 222, the processor usage 224, the playback buffer level 226, or any combination thereof.

As shown, in some embodiments, the server/network state data 230 specifies the most recent version of server metadata 194. In the same or other embodiments, the server/network state data 230 specifies, without limitation, applied pacing values 232 and a packet loss rate 234. As described previously herein in conjunction with FIG. 1, each of the applied pacing values 232 is a TCP parameter value that is set by the pacing engine 136 to configure the pacing of the persistent TCP connection 130. The packet loss rate 234 specifies the fraction of the total packets emitted by the server TCP/IP stack 140 over the persistent TCP connection 130 that were dropped before reaching the client TCP/IP stack 170.

In some embodiments, upon receiving the encoding profile 210, the pacing request engine 166 executes any number and/or types of rules, heuristics, algorithms, etc., to determine whether to generate pacing specification 192 based on the encoding profile 210, the client device state data 220, the server/network state data 230, the pacing computation constants 240, the manifest file 124, or any combination thereof. For instance, in some embodiments, the pacing request engine 166 compares the playback buffer level 226 to the minimum buffer requirement 242 to determine whether to generate pacing specification 192.

In some embodiments, the pacing request engine 166 determines whether to generate pacing specification 192 based on the device capability 222. For instance, if the device capability 222 indicates that the processor 112(1) is a low-end processor, then the pacing request engine 166 generates pacing specification 192. Otherwise, the pacing request engine 166 does not generate pacing specification 192.

In the same or other embodiments, the pacing request engine 166 executes any number and/or types of rules, heuristics, algorithms, etc., to generate the pacing specification 192 based on the encoding profile 210, the client device state data 220, the server/network state data 230, the pacing computation constants 240, the manifest file 124, or any combination thereof. As shown, in some embodiments, the pacing request engine 166 computes an instantaneous encoding rate 250 based on the average encoding rate 212 and the encoded chunk size 214. The pacing request engine 166 then computes pacing rate 260 based on the instantaneous encoding rate 250 and any amount (including none) and/or types of data. For instance, in some embodiments, the pacing request engine 166 computes the pacing rate 260 based on the instantaneous encoding rate 250 and the playback buffer level 226.

In some embodiments, the pacing request engine 166 does not compute the instantaneous encoding rate 250 and can compute the pacing rate 260 in any technically feasible fashion based on any amount and/or type of data. For instance, in some embodiments, the pacing request engine 166 sets the pacing rate 260 equal to the product of a single multiplier that is included in the rate multiplier(s) 244 and the highest average bitrate specified in the manifest file 124.

In some embodiments, the pacing request engine 166 determines maximum segments 294 in any technically feasible fashion based on any amount and/or type of data. In some embodiments, the pacing request engine 166 evaluates a tradeoff between decreasing the maximum segments 294 to decrease burstiness associated with the encoded chunk content 184 at the expense of a higher load on the processor 112(0).

As shown, in the same or other embodiments, the pacing request engine 166 computes the minimum gap 292 based on the pacing rate 260 and the maximum segments 294. The pacing request engine 166 then generates the pacing specification 192 that specifies, without limitation, the minimum gap 292 and the maximum segments 294.

As part of generating the pacing specification 192, the pacing request engine 166 can evaluate any number (including none) and/or types of tradeoffs in addition or instead of the maximum segments 294 vs processor load tradeoff described above. In some embodiments, the pacing request engine 166 can indirectly evaluate any number of tradeoffs via any number of rules, heuristics, algorithms, etc. Advantageously, relative to conventional media streaming, because the pacing request engine 166 has access to data that is available to neither the media delivery application 134 nor the server TCP/IP stack 140, the pacing request engine 166 can more effectively optimize the pacing of packet emissions.

Packet Emissions Corresponding to Different Pacing Specifications

Figure 3A:
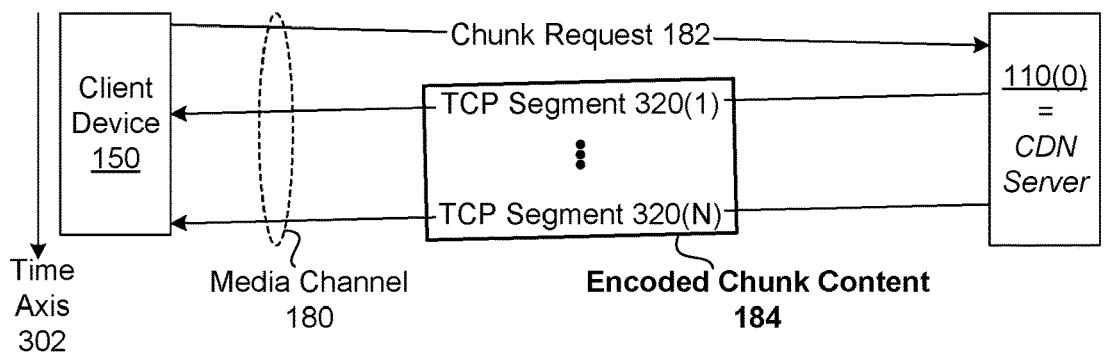
FIG. 3A is a more detailed illustration of the encoded chunk content of FIG. 1 being transmitted over a media channel, according to various embodiments.

FIG. 3A is a more detailed illustration of the encoded chunk content 184 of FIG. 1 being transmitted over the media channel 180, according to various embodiments. For explanatory purposes, an arrow indicates the direction in which time increases along a time axis 302. Referring back to FIG. 1, in some embodiments, the playback application 160 executing on the compute instance 110(1) or "client device" issues the encoded chunk request 182 specifying an encoded chunk to the media delivery application 134 executing on the compute instance 110(0) or "CDN server device."

In some embodiments, to transmit the encoded chunk content 184 of the specified encoded chunk to the playback application 160, the media delivery application 134 issues an HTTP response. As shown, to implement the HTTP response, the server TCP/IP stack 140 distributes the encoded chunk content 184 in playback order across TCP segments 320(1)-320(N), where N can be any positive integer. For explanatory purposes, the TCP segments 320(1)-320(N) are also referred to herein individually as "TCP segment 320" and collectively as "TCP segments 320."

As described previously herein in conjunction with FIG. 1, the server TCP/IP stack 140 wraps each of the TCP segments 320 with IP header information to generate a corresponding packet. The server TCP/IP stack 140 transmits the packets in the playback order of the associated TCP segments 320(1)-320(N) from the compute instance 110(0) to the client device 150 over the persistent TCP connection 130, via the media channel 180. In some embodiments, there is no packet loss during the transmission of the encoded chunk content 184, and therefore the TCP segments 320 arrive at the client device 150 in playback order.

Figure 3B:
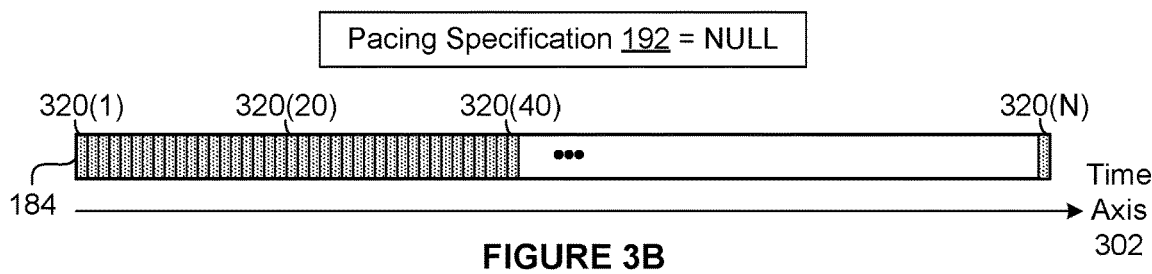
FIG. 3B is a more detailed illustration of the TCP segments of FIG. 3A when client-controlled pacing is not implemented, according to various embodiments.

FIG. 3B is a more detailed illustration of the TCP segments 320 of FIG. 3A when client-controlled pacing is not implemented, according to various embodiments. As shown, in some embodiments, when the pacing specification 192 is NULL, the pacing engine 136 does not configure the server TCP/IP stack 140 to implement any pacing. As shown, the server TCP/IP stack 140 delivers the packets carrying the TCP segments 320(1)-320(40) back-to-back in a relatively large burst of 40 packets. Although not shown, the server TCP/IP stack 140 delivers the packets carrying TCP segments 320(41)-320(N) in subsequent bursts of up to 40 packets.

Figure 3C:
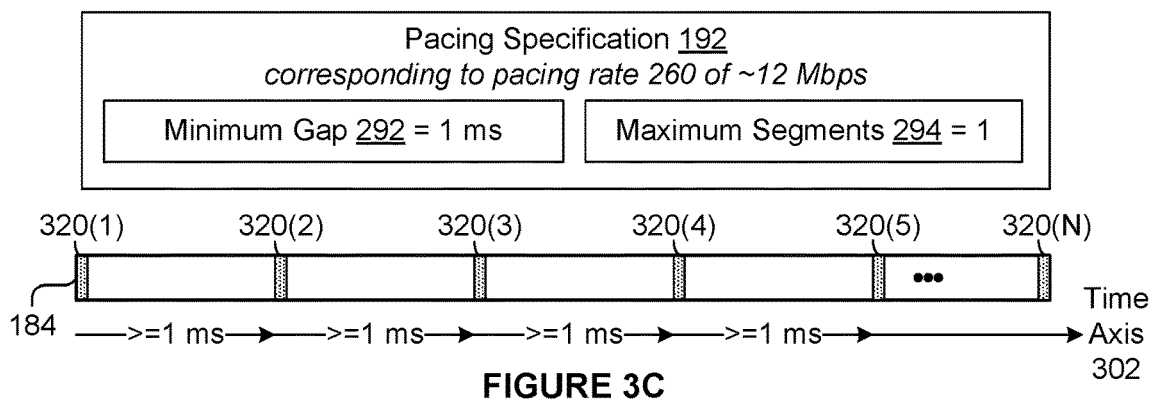
FIG. 3C is a more detailed illustration of the TCP segments of FIG. 3A when client-controlled pacing is implemented in accordance with a pacing specification, according to various embodiments.

FIG. 3C is a more detailed illustration of the TCP segments 320 of FIG. 3A when client-controlled pacing is implemented in accordance with a pacing specification, according to various embodiments. As shown, in some embodiments, the pacing specification 192 specifies the minimum gap 292 of one ms and the maximum segments 294 of one, corresponding to the pacing rate of approximately 12 Mbps.

As per the pacing specification 192, for a variable x from 1 to N−1, after emitting the packet carrying the TCP segment 320(x) onto the media channel 180, the server TCP/IP stack 140 waits at least one ms before injecting the packet carrying the TCP segment 320(x+1) onto the media channel 180. Relative to the unpaced transmission of the encoded chunk content 184 depicted in FIG. 3B, enforcing a gap of at least one ms between each packet emission results in an average transmission rate of 12 Mbps and a significant reduction in burstiness.

Figure 3D:
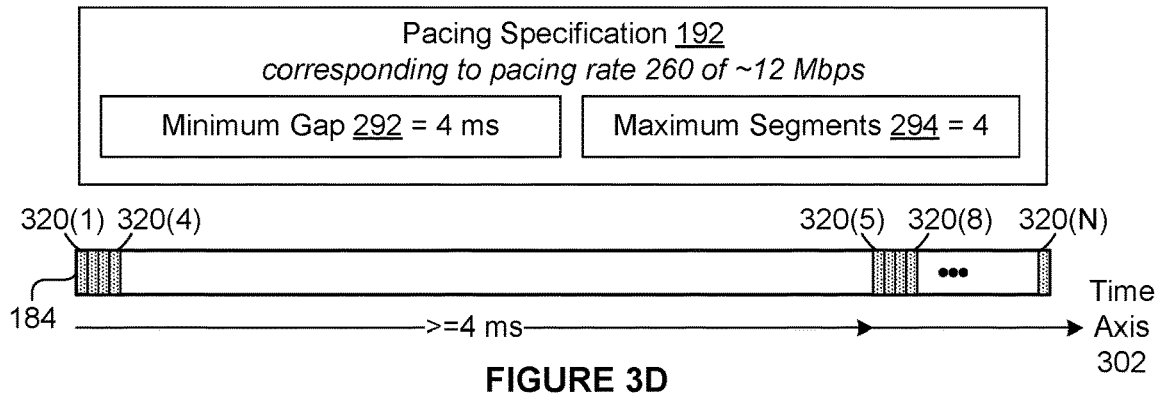
FIG. 3D is a more detailed illustration of the TCP segments of FIG. 3A when client-controlled pacing is implemented in accordance with another pacing specification, according to other various embodiments.

FIG. 3D is a more detailed illustration of the TCP segments 320 of FIG. 3A when client-controlled pacing is implemented in accordance with another pacing specification, according to other various embodiments. As shown, in some embodiments, the pacing specification 192 specifies a minimum gap 292 of four ms and a maximum segments 294 of four, corresponding to the pacing rate of approximately 12 Mbps.

As per the pacing specification 192, the server TCP/IP stack 140 emits four packets carrying the TCP segments 320(1)-320(4) onto the media channel 180 back-to-back, waits at least 4 ms, emits another four packets carrying the TCP segments 320(5)-320(8) onto the media channel 180 back-to-back, and so forth.

Relative to the unpaced transmission of the encoded chunk content 184 depicted in FIG. 3B, enforcing a gap of at least four ms between emitting each burst of at most four packets results in an average transmission rate of approximately 12 Mbps and a significant reduction in burstiness. By contrast, the burstiness is significantly increased relative to the paced transmission of the encoded chunk content 184 that is depicted in FIG. 3C. The paced transmission of the encoded chunk content 184 that is depicted in FIG. 3C has a similar average transmission rate of approximately 12 Mbps but a gap of at least one ms between each packet depicted in FIG. 3C. Notably, increasing the maximum segments 294 from one to four reduces the number of outbound processing operations the server TCP/IP stack 140 performs, and therefore the load on the processor 112(0).

As persons skilled in the art will recognize, the impact of client-controlled pacing (as per the pacing specification 192) on the playback application 160 and any number of software applications that rely on competing TCP connections that share the bottleneck link of the persistent TCP connection 130 can vary based on a wide range of factors. Some of the most significant factors can include, without limitation, whether the pacing rate 260 is below the bottleneck rate, the amount and type of TCP traffic associated with any competing TCP connections, and whether the persistent TCP connection 130 is associated with the slow start, the congestion avoidance, or the recovery mode.

Advantageously, client-controlled pacing of the persistent TCP connection 130 temporally spreads out the arrival of packets at the bottleneck link of the persistent TCP connection 130. Accordingly, any competing connections can be more likely than the persistent TCP connection 130 to transmit bursts of packets into the bottleneck link and therefore are more likely to experience packet losses. As a result, the packet loss rate 234 of the persistent TCP connection 130 can be reduced and the packet loss rate of one or more competing TCP connections can be increased. As described previously herein, if the processor 112(1) is a relatively low-end processor, then a decrease in the packet loss rate can ultimately decrease re-buffering events. Decreasing re-buffering events decreases playback interruptions and increases QoE for the user of the playback application.

In addition, when the pacing rate 260 is lower than the bottleneck rate and the bottleneck link is not shared with any other connection, packets traveling over the persistent TCP connection 130 trigger neither network buffering nor packet losses, and therefore the latency of the packets can be optimized. When the pacing rate 260 is lower than the bottleneck rate and the bottleneck link is shared with one or more other connections, the latency of packets transmitted over all connections sharing the bottleneck link can be reduced. As a result, the QoE associated with any latency-sensitive applications relying on any connection that shares a bottleneck link can be increased.

Figure 4:
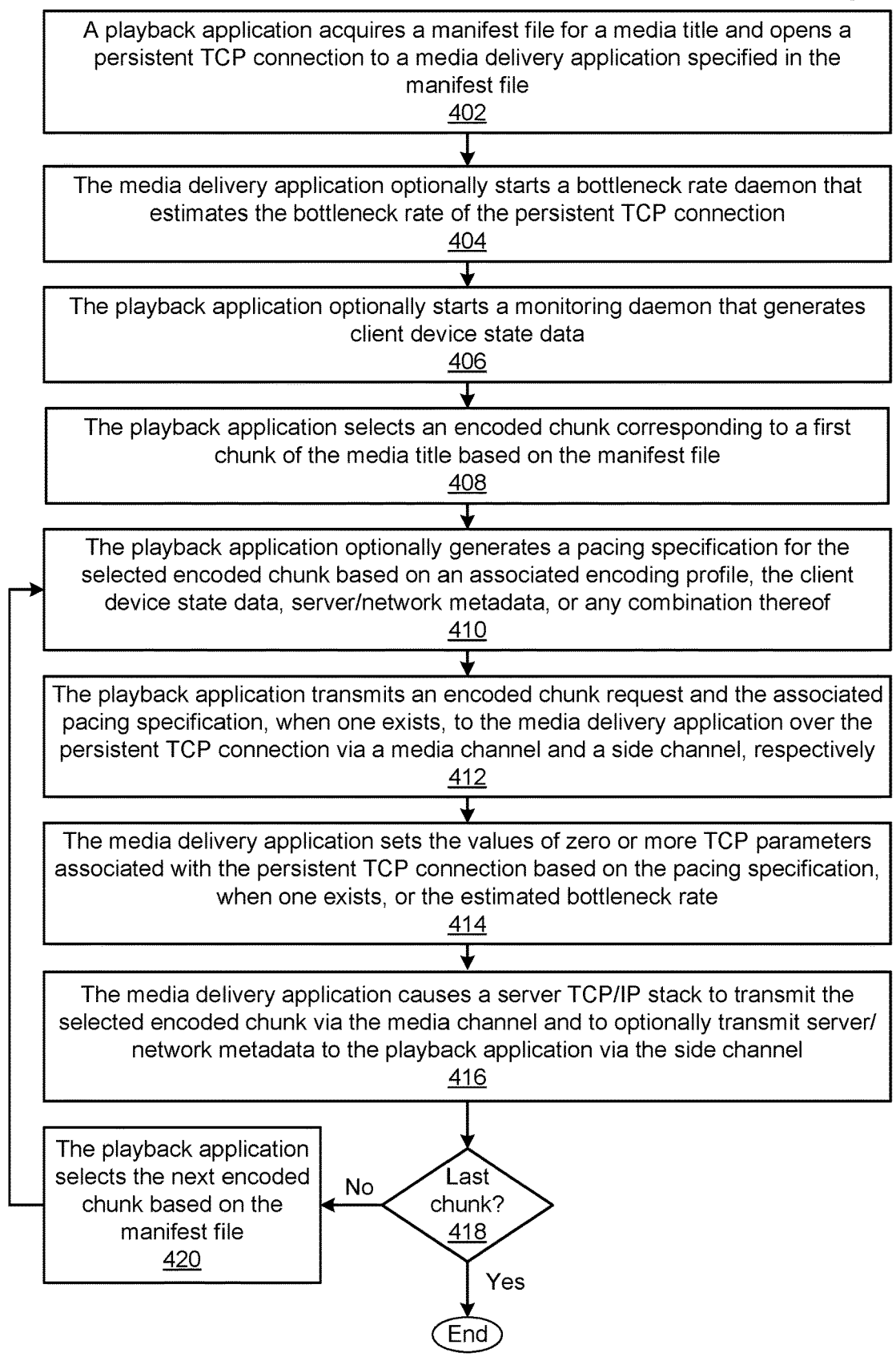
FIG. 4 is a flow diagram of method steps for transmitting encoded chunks of a media title over a TCP connection during streaming, according to various embodiments.

FIG. 4 is a flow diagram of method steps for transmitting encoded chunks of a media title over a TCP connection during streaming, according to various embodiments. Although the method steps are described with reference to the systems of FIGS. 1-3D, persons skilled in the art will understand that any system configured to implement the method steps, in any order, falls within the scope of the various embodiments.

As shown, a method 400 begins at step 402, where the playback application 160 acquires the manifest file 124 for a media title and opens persistent TCP connection 130 to media delivery application 134 identified in the manifest file 124. At step 404, the media delivery application 134 optionally starts bottleneck rate daemon 138 that repeatedly estimates the bottleneck rate of the persistent TCP connection 130 based on any amount and/or type of data received from the server TCP/IP stack 140. At step 406, the playback application 160 optionally starts monitoring daemon 162 that determines client device state data 220.

At step 408, the playback application 160 selects an encoded chunk corresponding to the first chunk of the media title based on the manifest file 124. At step 410, the playback application 160 optionally generates a pacing specification for the selected encoded chunk based on an associated encoding profile, the client device state data 220, server/network state data 230, or any combination thereof. At step 412, the playback application 160 transmits an encoded chunk request and the associated pacing specification, when one exists, to the media delivery application 134 over the persistent TCP connection 130 via media channel 180 and side channel 190, respectively.

At step 414, the media delivery application 134 sets zero or more TCP parameters associated with the persistent TCP connection 130 based on the pacing specification, when one exists, or the estimated bottleneck rate. At step 416, the media delivery application 134 causes server TCP/IP stack 140 to transmit the selected encoded chunk via the media channel 180 and to optionally transmit server/network metadata to the playback application 160 via the side channel 190. At step 418, the playback application 160 determines whether the selected encoded chunk corresponds to the last chunk of the media title. If, at step 418, the playback application 160 determines that the selected encoded chunk does not correspond to the last chunk of the media title, then the method 400 proceeds to step 420.

At step 420, the playback application 160 selects the next encoded chunk based on the manifest file 124. The method 400 then returns to step 420, where the playback application 160 optionally generates a pacing specification for the newly selected encoded chunk. If, however, at step 418, the playback application 160 determines that the selected encoded chunk corresponds to the last chunk of the media title, then the method 400 terminates.

In sum, the disclosed techniques can be used to improve QoE associated with media streaming. In some embodiments, a playback application executing on a client device opens a persistent TCP connection to a media delivery application executing on a server in a CDN. To playback a chunk of a media title on the client device, the playback application attempts to select the highest possible quality encoded version of the chunk to stream to the client device based, at least in part, on the current performance of the persistent TCP connection and a playback buffer level. Based on the size of the selected encoded chunk and an average encoding rate, the playback application computes an instantaneous encoding rate. The playback application determines a pacing rate and a corresponding pacing specification based on the instantaneous encoding rate, the playback buffer level, client device state, server state, network state, or any combination thereof. The pacing specification specifies, without limitation, a lower bound on the gap between bursts of up to a maximum number of TCP segments. The playback application transmits an encoded chunk request corresponding to the selected encoded chunk and the pacing specification to the media delivery application over the TCP connection via a media channel and a side channel, respectively, In the same or other embodiments, upon receiving an encoded chunk request and optionally a pacing specification from the media delivery application over the TCP connection via the media channel and the side channel, respectively, the media delivery application determines a pacing strategy for the encoded chunk content. If the media delivery application received a pacing specification associated with the encoded chunk request, then the media delivery application sets zero or more TCP parameters based on the pacing specification. Otherwise, the media delivery application sets zero or more TCP parameters based on an estimate of the bottleneck rate of the TCP connection. The media delivery application retrieves the encoded chunk content corresponding to the encoded chunk request. The media delivery application then causes TCP to transmit the encoded chunk request and optionally any amount and/or type of server metadata to the media delivery application over the TCP connection via the media channel and the side channel, respectively. The server metadata specifies, without limitation, any amount and/or type of server state and/or network state.

At least one technical advantage of the disclosed techniques relative to the prior art is that, with the disclosed techniques, the rate and spacing with which packets carrying encoded media content are emitted onto a TCP connection during media streaming can be optimized based on the actual needs of a playback application. In that regard, with the disclosed techniques, a side channel enables the playback application to implement different levels of pacing that reduce the burstiness with which packets arrive at the bottleneck link and can therefore reduce the number of packet losses. When the playback application is executing on a relatively low-end processor, a reduction in the number of packet losses can result in an overall decrease in re-buffering events. In addition, if the pacing rate of packet emissions is lower than the bottleneck rate, then the latency of packets traversing the bottleneck link can be reduced. The QoE associated with any latency-sensitive applications relying on any connection that shares the bottleneck link can therefore be increased. These technical advantages provide one or more technical advancements over prior art approaches.

1. In some embodiments, a computer-implemented method for transmitting encoded chunks of a media title comprises receiving, via a media channel, a first encoded chunk request that has been transmitted over a Transmission Control Protocol (TCP) connection; receiving, via a side channel, a first pacing specification that is associated with the first encoded chunk request and has been transmitted over the TCP connection; retrieving first encoded chunk content that corresponds to the first encoded chunk request; setting a first parameter equal to a first parameter value based on the first pacing specification; and causing a first plurality of TCP segments corresponding to the first encoded chunk content to be transmitted, via the media channel, over the TCP connection in accordance with the first parameter value.

2. The computer-implemented method of clause 1, wherein the first pacing specification specifies at least one of a minimum temporal gap between bursts of TCP segments emitted onto the TCP connection, a maximum number of TCP segments permitted in each burst, or a maximum packet emission rate associated with the TCP segments.

3. The computer-implemented method of clauses 1 or 2, wherein the maximum number of TCP segments permitted in each burst comprises an integer that is greater than or equal to one.

4. The computer-implemented method of any of clauses 1-3, wherein the first encoded chunk request comprises a Hypertext Transfer Protocol (HTTP) GET range request.

5. The computer-implemented method of any of clauses 1-4, wherein the side channel comprises one or more extensions to HTTP that allow information to be embedded in one or more different types of HTTP messages.

6. The computer-implemented method of any of clauses 1-5, wherein causing the first plurality of TCP segments to be transmitted over the TCP connection comprises issuing an HTTP response specifying the first encoded chunk content.

7. The computer-implemented method of any of clauses 1-6, further comprising causing server metadata to be transmitted, via the side channel, over the TCP connection to a playback application executing on a client device.

8. The computer-implemented method of any of clauses 1-7, wherein the server metadata specifies at least one of a performance metric value associated with a server, a performance metric value associated with the TCP connection, or the first parameter value.

9. The computer-implemented method of any of clauses 1-8, wherein the first pacing specification is computed based on at least one of an encoding profile associated with the first encoded chunk content, a level of a playback buffer, a processor usage, or a performance metric value associated with the TCP connection.

10. The computer-implemented method of any of clauses 1-9, further comprising receiving, via the media channel, a second encoded chunk request that has been transmitted over the TCP connection; receiving, via the side channel, a second pacing specification that is associated with the second encoded chunk request and has been transmitted over the TCP connection; setting the first parameter equal to a second parameter value instead of the first parameter value based on the second pacing specification; and causing a second plurality of TCP segments corresponding to second encoded chunk content to be transmitted, via the media channel, over the TCP connection in accordance with the second parameter value.

11. In some embodiments, one or more non-transitory computer readable media include instructions that, when executed by one or more processors, cause the one or more processors to transmit encoded chunks of a media title by performing the steps of receiving, via a media channel, a first encoded chunk request that has been transmitted over a Transmission Control Protocol (TCP) connection; receiving, via a side channel, a first pacing specification that is associated with the first encoded chunk request and has been transmitted over the TCP connection; generating a first response to the first encoded chunk request, wherein the first response specifies first encoded chunk content; setting a first parameter equal to a first parameter value based on the first pacing specification; and causing a first plurality of TCP segments corresponding to the first response to be transmitted, via the media channel, over the TCP connection in accordance with the first parameter value.

12. The one or more non-transitory computer readable media of clause 11, wherein the first pacing specification specifies at least one of a minimum temporal gap between bursts of TCP segments emitted onto the TCP connection, a maximum number of TCP segments permitted in each burst, or a maximum packet emission rate associated with the TCP segments.

13. The one or more non-transitory computer readable media of clauses 11 or 12, wherein the maximum number of TCP segments permitted in each burst comprises an integer that is greater than or equal to one.

14. The one or more non-transitory computer readable media of any of clauses 11-13, wherein the first encoded chunk request comprises a Hypertext Transfer Protocol (HTTP) GET range request.

15. The one or more non-transitory computer readable media of any of clauses 11-14, wherein receiving the first pacing specification comprises receiving the first pacing specification or an encoded version of the first pacing specification through a Uniform Resource Locator or an HTTP header associated with the first encoded chunk request.

16. The one or more non-transitory computer readable media of any of clauses 11-15, wherein the first response comprises an HTTP response, and further comprising adding server metadata to a Uniform Resource Locator (URL) or to an HTTP header associated with the first response in order to transmit the server metadata, via the side channel, over the TCP connection to a playback application executing on a client device.

17. The one or more non-transitory computer readable media of any of clauses 11-16, wherein the server metadata specifies at least one of a performance metric value associated with a server, a performance metric value associated with the TCP connection, or the first parameter value.

18. The one or more non-transitory computer readable media of any of clauses 11-17, wherein the first pacing specification is computed based on at least one of an instantaneous encoding rate associated with the first encoded chunk content, a level of a playback buffer, an average encoding rate, or a size of the first encoded chunk content.

19. The one or more non-transitory computer readable media of any of clauses 11-18, further comprising receiving, via the media channel, a second encoded chunk request that has been transmitted over the TCP connection; determining that the second encoded chunk request is not associated with a pacing specification; generating a second response to the second encoded chunk request, wherein the second response specifies second encoded chunk content; setting the first parameter equal to a second parameter value instead of the first parameter value based on a bottleneck rate associated with the TCP connection; and causing a second plurality of TCP segments corresponding to the second response to be transmitted, via the media channel, over the TCP connection in accordance with the second parameter value.

20. In some embodiments, a system comprises one or more memories storing instructions and one or more processors coupled to the one or more memories that, when executing the instructions, perform the steps of receiving, via a media channel, an encoded chunk request that has been transmitted over a Transmission Control Protocol (TCP) connection; receiving, via a side channel, a pacing specification that is associated with the encoded chunk request and has been transmitted over the TCP connection; retrieving encoded chunk content that corresponds to the encoded chunk request; and causing a plurality of packets to be emitted onto the media channel in accordance with the pacing specification, wherein the plurality of packets transmit the encoded chunk content, via the media channel, over the TCP connection.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.), or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general-purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for transmitting encoded chunks of a media title, the method comprising:

receiving, via a media channel, a first encoded chunk request that has been transmitted over a Transmission Control Protocol (TCP) connection;

receiving, via a side channel, a first pacing specification that is associated with the first encoded chunk request and has been transmitted over the TCP connection, wherein the first pacing specification imposes a maximum pacing rate at which first encoded chunk content is permitted to be transmitted;

retrieving the first encoded chunk content that corresponds to the first encoded chunk request;

setting a first parameter equal to a first parameter value based on the first pacing specification; and causing a first plurality of TCP segments corresponding to the first encoded chunk content to be transmitted, via the media channel, over the TCP connection in accordance with the first parameter value.

2. The computer-implemented method of claim 1, wherein the first pacing specification specifies at least one of a minimum temporal gap between bursts of TCP segments emitted onto the TCP connection, a maximum number of TCP segments permitted in each burst, or a maximum packet emission rate associated with the TCP segments.

3. The computer-implemented method of claim 2, wherein the maximum number of TCP segments permitted in each burst comprises an integer that is greater than or equal to one.

4. The computer-implemented method of claim 1, wherein the first encoded chunk request comprises a Hypertext Transfer Protocol (HTTP) GET range request.

5. The computer-implemented method of claim 1, wherein the side channel comprises one or more extensions to HTTP that allow information to be embedded in one or more different types of HTTP messages.

6. The computer-implemented method of claim 1, wherein causing the first plurality of TCP segments to be transmitted over the TCP connection comprises issuing an HTTP response specifying the first encoded chunk content.

7. The computer-implemented method of claim 1, further comprising causing server metadata to be transmitted, via the side channel, over the TCP connection to a playback application executing on a client device.

8. The computer-implemented method of claim 7, wherein the server metadata specifies at least one of a performance metric value associated with a server, a performance metric value associated with the TCP connection, or the first parameter value.

9. The computer-implemented method of claim 1, wherein the first pacing specification is computed based on at least one of an encoding profile associated with the first encoded chunk content, a level of a playback buffer, a processor usage, or a performance metric value associated with the TCP connection.

10. The computer-implemented method of claim 1, further comprising:

receiving, via the media channel, a second encoded chunk request that has been transmitted over the TCP connection;

receiving, via the side channel, a second pacing specification that is associated with the second encoded chunk request and has been transmitted over the TCP connection;

setting the first parameter equal to a second parameter value instead of the first parameter value based on the second pacing specification; and causing a second plurality of TCP segments corresponding to second encoded chunk content to be transmitted, via the media channel, over the TCP connection in accordance with the second parameter value.

11. One or more non-transitory computer readable media including instructions that, when executed by one or more processors, cause the one or more processors to transmit encoded chunks of a media title by performing the steps of:
receiving, via a media channel, a first encoded chunk request that has been transmitted over a Transmission Control Protocol (TCP) connection;
receiving, via a side channel, a first pacing specification that is associated with the first encoded chunk request and has been transmitted over the TCP connection, wherein the first pacing specification imposes a maximum pacing rate at which first encoded chunk content is permitted to be transmitted;
generating a first response to the first encoded chunk request, wherein the first response specifies the first encoded chunk content;
setting a first parameter equal to a first parameter value based on the first pacing specification; and
causing a first plurality of TCP segments corresponding to the first response to be transmitted, via the media channel, over the TCP connection in accordance with the first parameter value.

12. The one or more non-transitory computer readable media of claim 11, wherein the first pacing specification specifies at least one of a minimum temporal gap between bursts of TCP segments emitted onto the TCP connection, a maximum number of TCP segments permitted in each burst, or a maximum packet emission rate associated with the TCP segments.

13. The one or more non-transitory computer readable media of claim 12, wherein the maximum number of TCP segments permitted in each burst comprises an integer that is greater than or equal to one.

14. The one or more non-transitory computer readable media of claim 11, wherein the first encoded chunk request comprises a Hypertext Transfer Protocol (HTTP) GET range request.

15. The one or more non-transitory computer readable media of claim 11, wherein receiving the first pacing specification comprises receiving the first pacing specification or an encoded version of the first pacing specification through a Uniform Resource Locator or an HTTP header associated with the first encoded chunk request.

16. The one or more non-transitory computer readable media of claim 11, wherein the first response comprises an HTTP response, and further comprising adding server metadata to a Uniform Resource Locator (URL) or to an HTTP header associated with the first response in order to transmit the server metadata, via the side channel, over the TCP connection to a playback application executing on a client device.

17. The one or more non-transitory computer readable media of claim 16, wherein the server metadata specifies at least one of a performance metric value associated with a server, a performance metric value associated with the TCP connection, or the first parameter value.

18. The one or more non-transitory computer readable media of claim 11, wherein the first pacing specification is computed based on at least one of an instantaneous encoding rate associated with the first encoded chunk content, a level of a playback buffer, an average encoding rate, or a size of the first encoded chunk content.

19. The one or more non-transitory computer readable media of claim 11, further comprising:
receiving, via the media channel, a second encoded chunk request that has been transmitted over the TCP connection;
determining that the second encoded chunk request is not associated with a pacing specification;
generating a second response to the second encoded chunk request, wherein the second response specifies second encoded chunk content;
setting the first parameter equal to a second parameter value instead of the first parameter value based on a bottleneck rate associated with the TCP connection; and
causing a second plurality of TCP segments corresponding to the second response to be transmitted, via the media channel, over the TCP connection in accordance with the second parameter value.

20. A system comprising:
one or more memories storing instructions; and
one or more processors coupled to the one or more memories that, when executing the instructions, perform the steps of:
receiving, via a media channel, an encoded chunk request that has been transmitted over a Transmission Control Protocol (TCP) connection;
receiving, via a side channel, a pacing specification that is associated with the encoded chunk request and has been transmitted over the TCP connection, wherein the pacing specification imposes a maximum pacing rate at which encoded chunk content is permitted to be transmitted;
retrieving the encoded chunk content that corresponds to the encoded chunk request; and
causing a plurality of packets to be emitted onto the media channel in accordance with the pacing specification, wherein the plurality of packets transmit the encoded chunk content, via the media channel, over the TCP connection.

* * * * *